April 11, 1939.　　　C. A. THOMAS　　　2,153,599
FRACTIONATING APPARATUS
Filed Aug. 5, 1935
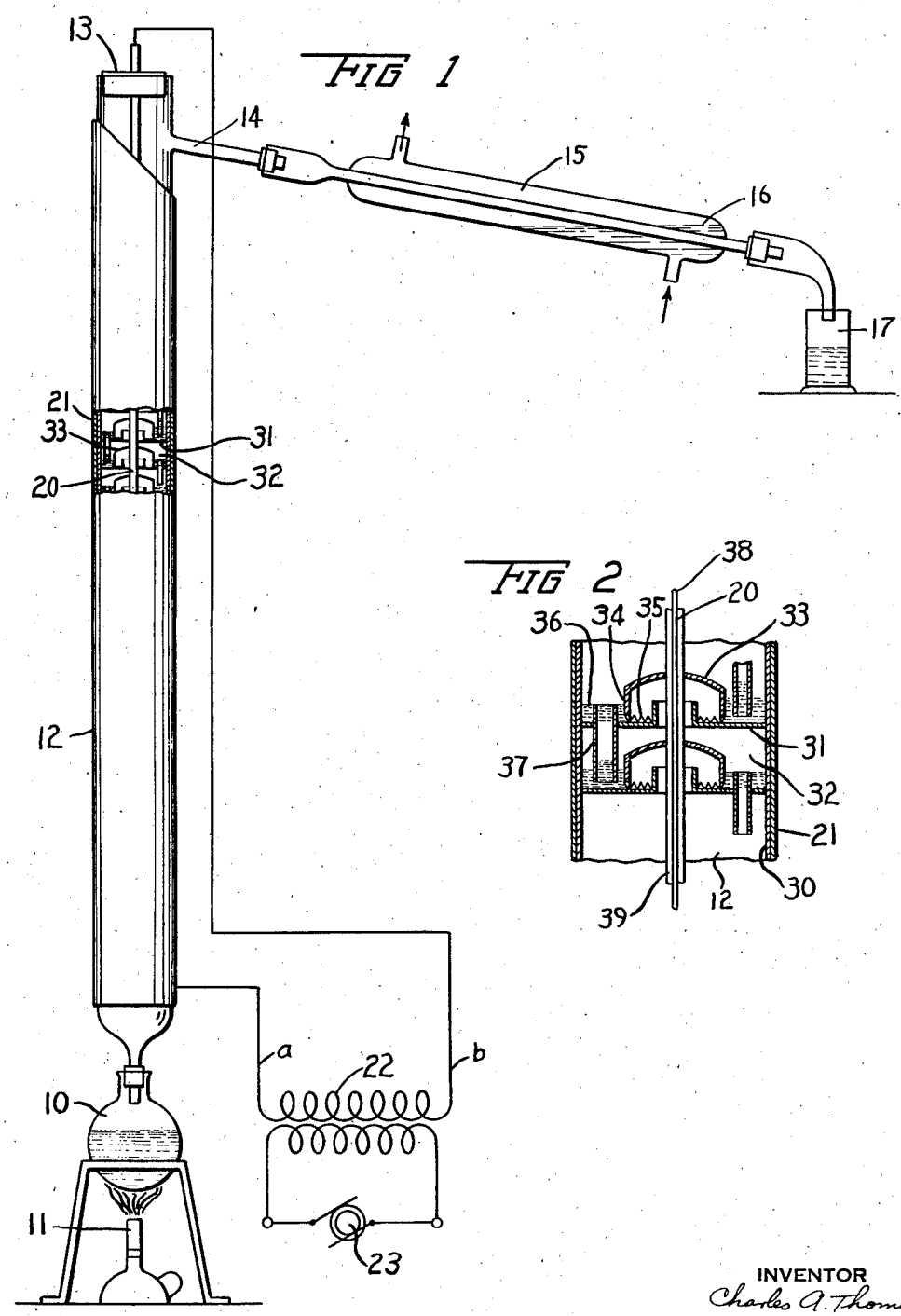
INVENTOR
Charles A. Thomas
BY
Maréchal & Noe
ATTORNEYS Patented Apr. 11, 1939

2,153,599

UNITED STATES PATENT OFFICE 2,153,599

FRACTIONATING APPARATUS

Charles A. Thomas, Dayton, Ohio, assignor, by mesne assignments, to Monsanto Chemical Company, St. Louis, Mo., a corporation of Delaware Application August 5, 1935, Serial No. 34,690

2 Claims. (Cl. 183—7)

This invention relates to an apparatus for distilling or fractionating a mixture of vaporous or vaporizable constituents. Distillation, as the term is used herein, is applied to those operations where vaporization of a liquid mixture yields a vapor phase containing more than one constituent and where it is desired to recover one or more of these constituents in a relatively pure state.

It is the principal object of the invention to provide an apparatus for the rapid and effective distillation of a fluid mixture into its constituents.

It is a further object to provide distillation or fractionation apparatus for the separation of fluid mixtures of different boiling points having means associated therewith for providing a very accurate, complete and rapid separation of fluids of different characteristics.

It is a further object to provide distillation or fractionation apparatus in which an electrostatic field is utilized to effect a rapid and complete distillation of a fluid mixture.

Other objects will be apparent from the description, the accompanying drawing and the appended claims.

In the drawing,

Fig. 1 is a view, somewhat diagrammatic in form, of one form of apparatus suitable for carrying out the invention;

Fig. 2 is a fragmentary vertical sectional view on an enlarged scale of the distillation column of Fig. 1, showing details thereof.

Referring to the drawing, there is shown an embodiment of apparatus for practicing the present invention, the apparatus including a suitable distillation or fractionation column. The column comprises a heating chamber 10 adapted to receive the fluid mixture to be fractionated, with a source of heat 11 positioned therebelow, and with a connection to the column 12 providing for the introduction of the vaporized fluid mixture thereinto. The mixture containing constituents of different boiling points or vapor pressure characteristics that it is desired to separate is supplied to the chamber 10 and, upon the application of suitable quantities of heat, the mixture if not already in the vapor state is caused to become vaporized and passes upwardly through the column 12. The rate of vaporization is preferably so controlled that the vapors pass up through the column at a relatively slow rate. As they pass through the column, the temperature thereof is gradually reduced and the fluid of higher boiling point tends to condense out of the mixture, in the form of relatively finely divided liquid particles. These condensed liquid particles are suspended in the gas in the column, and in large measure either drop out of suspension or come in contact with a surface in the column such as the walls of the column upon which they deposit as a liquid film or are removed as a result of the scrubbing action to which the gas is subjected as it passes through the bubble cap construction described below the separated condensed liquid being returned to the chamber 10 as reflux.

It is desirable that all of the fluid of higher boiling point be removed from the gas within the column in order to obtain an effective separation and fractionation of the constituents of the fluid mixture. Difficulty has been experienced heretofore in freeing the gas of small quantities of the constituent of higher boiling point, in either gaseous or liquid state, the liquid particles in suspension having been in some degree entrained in the moving column of gas notwithstanding the fact that the rate of passage of the fluids through the column has been very slow.

In accordance with the present invention an apparatus is provided by means of which a much more accurate and complete fractionation is obtained, even of fluid mixtures which are difficult to fractionate; and furthermore the rate of passage of fluids through the column can be satisfactorily increased, thereby effecting considerable economy in the size of apparatus required. In accordance with this invention the fluid mixture during its passage through the column is subjected to forces which tend to effectively segregate the constituents of the mixture and to reduce or entirely eliminate objectionable entrainment of liquid particles. It has been found that very extraordinary results in effectiveness of separation are obtained by subjecting the fluid mixture during its passage through the column to the action of an electrostatic field. Such action has been found to very considerably improve the operation of the column, and to provide for the discharge of a substantially pure fluid constituent substantially free of other undesired fluids. Thus when the column is operated under comparable conditions first without the electrostatic field and then with the field, a very much better fractionation is obtained, increased rates of operation are possible, and fluid mixtures which have been separable only with great difficulty heretofore are satisfactorily distilled.

The exact theoretical effect of the electrostatic field is not entirely understood, but it is believed to be highly effective in removing particles of condensed liquid from suspension. The field being effective in the zone and at the time the liquid particles are being formed, these particles, as soon as they are formed, are caused to coalesce with each other into larger particles and to travel to a fixed surface such as the wall of the column, where they aggregate to form larger drops or a film of liquid which passes down and returns as reflux. There is thus a quite complete removal of the liquid particles from suspension. The increase in the size of the suspended particles is thought to have a further important effect in reducing the vapor pressure of the condensed liquid so that there is less vapor pressure of its gas in the uncondensed fluid, with a resultant further decrease in the quantity of such condensed fluid which passes upwardly through the tube. Thus a much more highly effective and complete removal of one constituent from the other is obtained.

Any desired means for establishing such electrostatic field may be used. Fig. 1 shows such a means comprising a central electrode 20, positioned substantially axially of a cylindrical column, and passing in sealed relation through the cover member 13 at the top of the column. This conductor may be either a bare metal conductor or may comprise a metallic conductor enclosed in a glass shield where it is desired to avoid contact between a metal element and the fluids within the tube. For instance, such conductor may have the form of a column of mercury enclosed in a small glass tube.

An outer conductor 21 is attached to the outside of the column, and may conveniently comprise a metal foil sheet or the like surrounding the inner conductor and extending over the zone where it is desired to make the field effective. The two conductors are supplied with energy from a suitable source such as the secondary terminals $a$ and $b$ of transformer 22 which in turn may be energized from a suitable source of power, shown as generator 23. As illustrative of a character of energizing force which has been found to give entirely satisfactory results, the primary of the transformer may be energized from a 110 volt, 60 cycle line, and the transformer may have such characteristic that it will produce a secondary voltage of the order of 15,000 volts. The voltage may be considerably in excess of or below this value and preferably the transformer is of variable transformation ratio so that variations may be made in the secondary voltage to provide the conditions most satisfactory for the particular operation. Also a direct current of suitable potential may be used in which case suitable rectifying and capacitance means are provided in the secondary circuit of the transformer.

An offtake 14 communicating with the interior of the column below the top thereof, provides for the withdrawal of uncondensed gases passing through the column and substantially entirely freed of higher boiling point constituents. These gases may be led through a suitable condenser 15, to which a cooling fluid 16 may be provided to effect condensation of the gas, whereupon it may be collected in a receiver 17.

The detailed construction of the bubble cap column referred to above is particularly illustrated in Fig. 2, in which a small section of the complete column of Fig. 1 is shown, it being understood that there are a number of such sections or plates which go to make up the actual column. Column 12 as shown includes the walls 30, and the plates 31 separating the column into sections or chambers 32. The plate 31 has a central opening for the upward passage of vapor from a lower chamber into an upper chamber, a cap 33 being positioned over the opening and having a downturned flange 34 provided with passages 35 therein which allow the gas to pass therethrough, but cause it to pass through the body of liquid 36 overlying the plate where a scrubbing action occurs. Tube 37 extending above the level of plate 31 provides for the return of the liquid reflux from an upper chamber to a lower chamber.

Positioned substantially centrally and extending throughout the column is electrode 20 which may comprise metal rod 38 enclosed in a glass tube 39 as described above. The other electrode 21 may be positioned on the wall of the column, the electrodes being connected to terminals $a$ and $b$ for operation as described above. The operation of the column upon application of the electrostatic field is substantially as described above and further description thereof is thought unnecessary. The use of an electrostatic field as described in a bubble cap column provides the very much improved results in operation as described.

As a specific example, very satisfactory results have been secured in the separation of chloroform and carbon tetrachloride, two liquids which boil within approximately 15 degrees of each other. This mixture was vaporized and passed through a glass column 20 millimeters in diameter and approximately 3 feet in height. The column was provided with electrodes as described above. A reflux ratio of 4 to 1 was maintained and an equal volume mixture of carbon tetrachloride and chloroform were distilled. (Reflux ratio is defined as the ratio of the volume of condensate returned to the column to that withdrawn as product.) The distillation was conducted with and without an electrostatic field, the voltage being 15,000 volts. In both cases the vapor rate through the column, the reflux ratio and the condensate withdrawn were held constant. The purity of the components obtained or the degree of fractionation obtained, was determined in both cases by measurement of the refractive index of the components. Without the electrostatic field each successive portion delivered from the column showed some increase in refractive index indicating the failure to distill a pure fraction of chloroform, while when distilling in the presence of the electrostatic field the index of refraction measurements corresponded to those of pure chloroform and carbon tetrachloride respectively, indicating that substantially pure fractions were obtained.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A stripping column of the character described for separating a mixture of fluids of different boiling point characteristics including means for vaporizing said mixture of fluids to a gaseous state and for passing said gaseous mixture into said column, a plurality of plates in said column having openings therein and each retaining a body of condensed liquid, bubble caps over said openings and sealed in said liquid providing for the passage of a fluid mixture upwardly through the column and for subjecting such fluid mixture to a scrubbing action incident to the passage of each bubble cap, the column having a temperature gradient distributed thereover and between successive plates, means providing for the return of liquid reflux while maintaining a predetermined level of condensed liquid over each said plate, and means for subjecting the column intermediate each bubble cap to a high intensity electrostatic field adapted to control the particle size and precipitation of condensed liquid particles, to effect complete stripping of a constituent of said fluid mixture.

2. A distillation column for separating a mixture of fluids of different boiling point characteristics including means for vaporizing said mixture of fluids to a gaseous state and for passing said gaseous mixture into said column, a plurality of spaced plates in said column, tubular means extending through each plate and having a part extending above the surface of the respective plate providing for maintaining a predetermined quantity of liquid above each plate and for continuous discharge of liquid therethrough, each plate having an aperture providing for the upward passage of gaseous mixture and suspended particles therethrough, an upstanding shoulder formed around said aperture to prevent discharge of liquid therethrough, a bubble cap positioned over said aperture and having a skirt portion overlapping said shoulder exteriorly thereof and extending below the normal level of the liquid over the respective plate, said column having a temperature gradient distributed thereover and between successive plates to provide for condensation of liquid in the spaces between successive plates, and means for subjecting the interior of said column intermediate the bubble caps to an electrostatic field adapted to effect separation at each successive space of a higher boiling point condensed constituent from said mixture intermediate successive plates, said condensed liquid forming a maintained body over each plate through which the upwardly flowing gaseous constituent is bubbled to effect scrubbing and substantially complete separation of entrained condensed particles therefrom.

CHARLES A. THOMAS.